(12) United States Patent
Longenecker (10) Patent No.: US 11,371,761 B2
(45) Date of Patent: Jun. 28, 2022

(54) METHOD OF OPERATING AN AIR CONDITIONER UNIT BASED ON AIRFLOW

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 57 days.

(21) Appl. No.: 16/846,791

(22) Filed: Apr. 13, 2020

(65) Prior Publication Data

US 2021/0318043 A1 Oct. 14, 2021

(51) Int. Cl.
F25B 47/02 (2006.01)

(52) U.S. Cl.
CPC ............ *F25B 47/025* (2013.01); *F25B 47/02* (2013.01); *F25B 2700/135* (2013.01); *F25B 2700/173* (2013.01)

(58) Field of Classification Search
CPC ...... F25B 47/02; F25B 47/022; F25B 47/025; F25B 2700/135; F25B 2700/17; F25B 2700/173; F25B 2313/0293; F25B 2600/112; F25B 2347/02; F25B 2347/021; F25B 2347/023; F24F 11/41; F24F 11/43
See application file for complete search history.

(56) References Cited

U.S. PATENT DOCUMENTS

| | | | | |
|---|---|---|---|---|
| 3,992,895 A * | 11/1976 | Kramer | ................. | F25B 47/022 62/155 |
| 4,538,420 A * | 9/1985 | Nelson | ................. | F25D 21/002 62/140 |
| 4,698,981 A * | 10/1987 | Kaneko | ................. | F25B 13/00 62/180 |
| 5,319,943 A * | 6/1994 | Bahel | ................. | F25B 47/025 62/156 |
| 5,408,837 A * | 4/1995 | Omura | ................. | F25B 49/027 62/89 |
| 5,440,890 A * | 8/1995 | Bahel | ................. | F25D 21/006 62/81 |
| 8,365,541 B2 * | 2/2013 | Hanley | ................. | F25D 21/008 62/80 |
| 9,341,405 B2 * | 5/2016 | Qu | ................. | F25D 21/002 |
| 9,557,085 B2 * | 1/2017 | Hamada | ................. | F25B 49/02 |
| 9,605,889 B2 * | 3/2017 | Qu | ................. | F25D 21/02 |
| 9,791,163 B2 * | 10/2017 | McKie | ................. | F24F 12/006 |
| 10,168,067 B2 * | 1/2019 | Gokhale | ................. | F25B 47/006 |

(Continued)

*Primary Examiner* — Miguel A Diaz
(74) *Attorney, Agent, or Firm* — Dority & Manning, P.A.

(57) ABSTRACT

A method of operating an air conditioner unit, as provided herein, includes initiating a first heat pump cycle, the first heat pump cycle comprising sending a control signal to the fan to rotate at a predetermined rotational speed, and detecting an actual rotational speed of the fan, calculating a first flow rate of air through the first heat exchanger based on the control signal and the actual rotational speed, storing the first flow rate as a first reference flow rate, stopping the first heat pump cycle, initiating a second heat pump cycle, calculating a second flow rate of air through the first heat exchanger, comparing the calculated second flow rate to the first reference flow rate, and directing the air conditioner unit based on the comparison of the calculated second flow rate to the first reference flow rate.

20 Claims, 4 Drawing Sheets

(56) References Cited

U.S. PATENT DOCUMENTS

| | | | |
|---|---|---|---|
| 10,222,108 B2* | 3/2019 | Naito | F25B 47/025 |
| 10,352,611 B2* | 7/2019 | Qu | F25B 47/02 |
| 10,386,087 B2* | 8/2019 | McKie | F24F 12/006 |
| 11,034,210 B2* | 6/2021 | Goel | B60H 1/3222 |
| 11,168,932 B2* | 11/2021 | Schimmele | F25B 49/005 |
| 2007/0089435 A1* | 4/2007 | Singh | F25B 49/005 62/129 |
| 2011/0094250 A1* | 4/2011 | Gourgouillat | F25B 47/022 62/139 |
| 2011/0302937 A1 | 12/2011 | Walter, Jr. | |
| 2012/0047920 A1* | 3/2012 | Hanley | F25D 21/008 62/80 |
| 2012/0060530 A1* | 3/2012 | Shimoda | F25B 13/00 62/132 |
| 2012/0111042 A1* | 5/2012 | Hamada | F25B 47/025 62/157 |
| 2012/0144849 A1* | 6/2012 | Smith | B60H 1/3225 62/89 |
| 2013/0118188 A1* | 5/2013 | McKie | F24F 12/006 62/81 |
| 2014/0150477 A1* | 6/2014 | Qu | F25D 21/006 62/80 |
| 2016/0258668 A1* | 9/2016 | Qu | F25D 17/06 |
| 2017/0010031 A1* | 1/2017 | Naito | F25B 47/025 |
| 2017/0082308 A1* | 3/2017 | Gokhale | F25D 21/02 |
| 2017/0191732 A1* | 7/2017 | Qu | F25B 13/00 |
| 2018/0335244 A1* | 11/2018 | Haaf | F24F 11/43 |
| 2019/0003760 A1* | 1/2019 | Goodjohn | F25B 49/02 |
| 2020/0025432 A1* | 1/2020 | Schimmele | F25D 21/02 |
| 2021/0046800 A1* | 2/2021 | Goel | F25B 49/022 |
| 2021/0055035 A1* | 2/2021 | Teng | F25D 21/02 |
| 2021/0076846 A1* | 3/2021 | Saneyoshi | F25D 23/00 |
| 2021/0237535 A1* | 8/2021 | Goel | F24F 11/86 |
| 2021/0278115 A1* | 9/2021 | Donnellan | F25B 49/027 |
| 2021/0302055 A1* | 9/2021 | Noor | F24F 11/41 |

* cited by examiner

METHOD OF OPERATING AN AIR CONDITIONER UNIT BASED ON AIRFLOW

FIELD OF THE INVENTION

The present subject matter relates generally to air conditioner units, and more particularly to methods of operation and frost detection on air conditioning units.

BACKGROUND OF THE INVENTION

Air conditioner units are conventionally utilized to adjust the temperature within structures such as dwellings and office buildings. In particular, one-unit type or single-package air conditioner units, such as window units, single-package vertical units (SPVU), vertical packaged air conditioners (VPAC), or package terminal air conditioners (PTAC) may be utilized to adjust the temperature in, for example, a single room or group of rooms of a structure. Such units are especially common in hotels, rental apartments, and assisted-living facilities in which a large number of occupants live within the same building.

A typical one-unit type air conditioner unit or air conditioning appliance includes an indoor portion and an outdoor portion. The indoor portion generally communicates (e.g., exchanges air) with the area within a building, and the outdoor portion generally communicates (e.g., exchanges air) with the area outside a building. Accordingly, the air conditioner unit generally extends through, for example, a wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through, for example, the indoor portion of the air conditioner unit. One or more control boards are typically provided to direct the operation of various elements of the particular air conditioner unit.

When a typical one-unit air conditioner unit operates during a cold outdoor condition, frost may be generated on a heat exchange coil of the outdoor portion. This frost is difficult to detect using temperature sensors alone. For instance, a conventional air conditioner unit may utilize an exterior air temperature sensor to simply measure a condition in which frost might form. Consequently, conventional air conditioner units are inefficient in running defrost cycles (e.g., defrost cycles are run too often or not enough). Specifically, exterior air temperature sensors may give false readings and incorrectly detect frost on a conventional air conditioner unit and thus unnecessarily run a defrost cycle. This in turn wastes electricity and energy. Similarly, other methods of detecting frost on conventional air conditioner units, such as air flow sensors or refrigerant temperature sensors, may also give trigger false indications of a presence of frost.

Accordingly, it may be useful to provide an air conditioner unit addressing one or more of the above-identified issues. In particular, it may be advantageous to provide an air conditioner unit or method of operation that can detect frost in a more accurate or efficient way.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating an air conditioner is provided. The method may include initiating a first heat pump cycle, which may include sending a control signal to the fan to rotate at a predetermined rotational speed and detecting an actual rotational speed of the fan. The method may further include calculating a first flow rate of air through the first heat exchanger based on the control signal and the actual rotational speed, storing the first flow rate as a first reference flow rate, stopping the first heat pump cycle, and initiating a second heat pump cycle. The method may still further include calculating a second flow rate of air through the first heat exchanger, comparing the calculated second flow rate to the first reference flow rate, and directing the air conditioner unit based on the comparison of the calculated second flow rate to the first reference flow rate.

In another exemplary embodiment of the present disclosure, an air conditioner unit is provided. The air conditioner unit may include a sealed refrigerant system comprising a refrigerant conduit, a first heat exchanger, an expansion device, and a second heat exchanger in fluid communication with each other along the refrigerant conduit, and a compressor to drive a refrigerant through the sealed refrigerant system, a fan located adjacent to the first heat exchanger to circulate air over the first heat exchanger, and a controller configured to initiate an operation sequence. The operation sequence may include initiating a heat pump cycle, the heat pump cycle comprising sending a control signal to the fan to rotate at a predetermined rotational speed, and detecting an actual rotational speed of the fan; calculating a first flow rate of air through the heat exchanger based on the control signal and the actual rotational speed; storing the first flow rate as a first reference flow rate; and stopping the heat pump cycle. The operation sequence may further include initiating a second heat pump cycle; calculating a second flow rate of air through the first heat exchanger; comparing the calculated second flow rate to the first reference flow rate; and directing the air conditioner unit based on the comparison of the calculated second flow rate to the first reference flow rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The phrase "in one embodiment," does not necessarily refer to the same embodiment, although it may. The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 1:
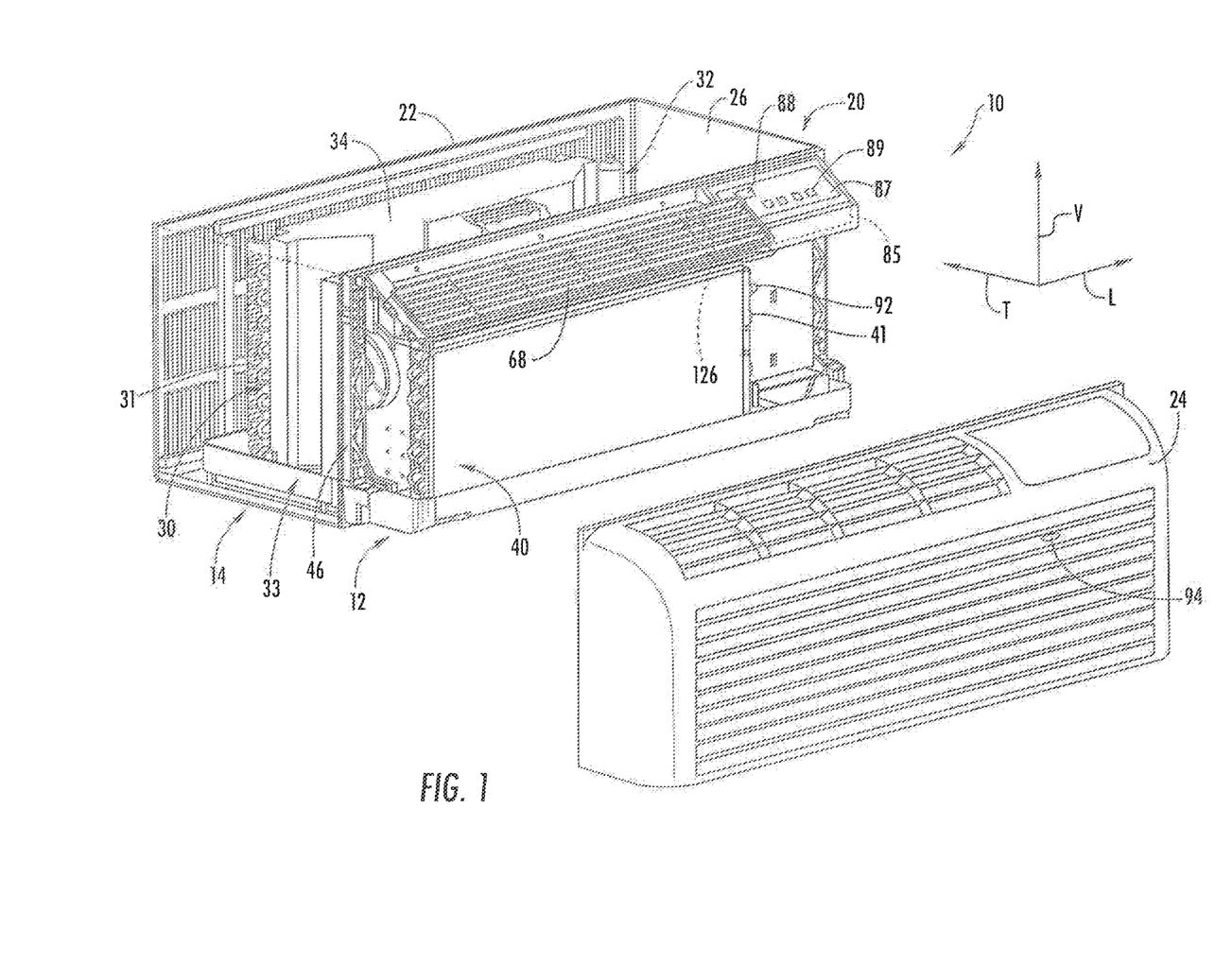
FIG. 1 provides a perspective view of an air conditioner unit, with a room front exploded from a remainder of the air conditioner unit for illustrative purposes, in accordance with exemplary embodiments of the present disclosure.
Figure 2:
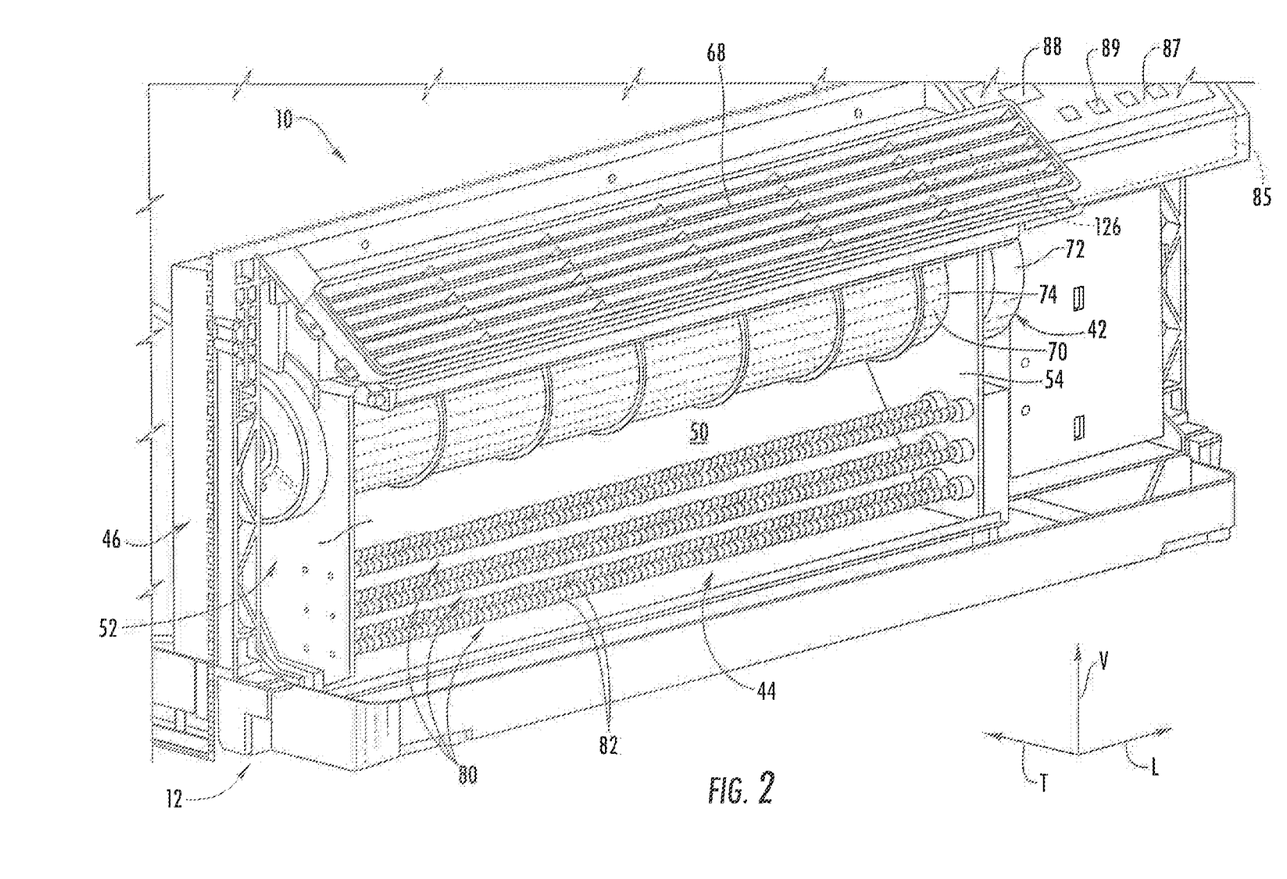
FIG. 2 is a perspective view of components of an indoor portion of an air conditioner unit in accordance with exemplary embodiments of the present disclosure.
Figure 3:
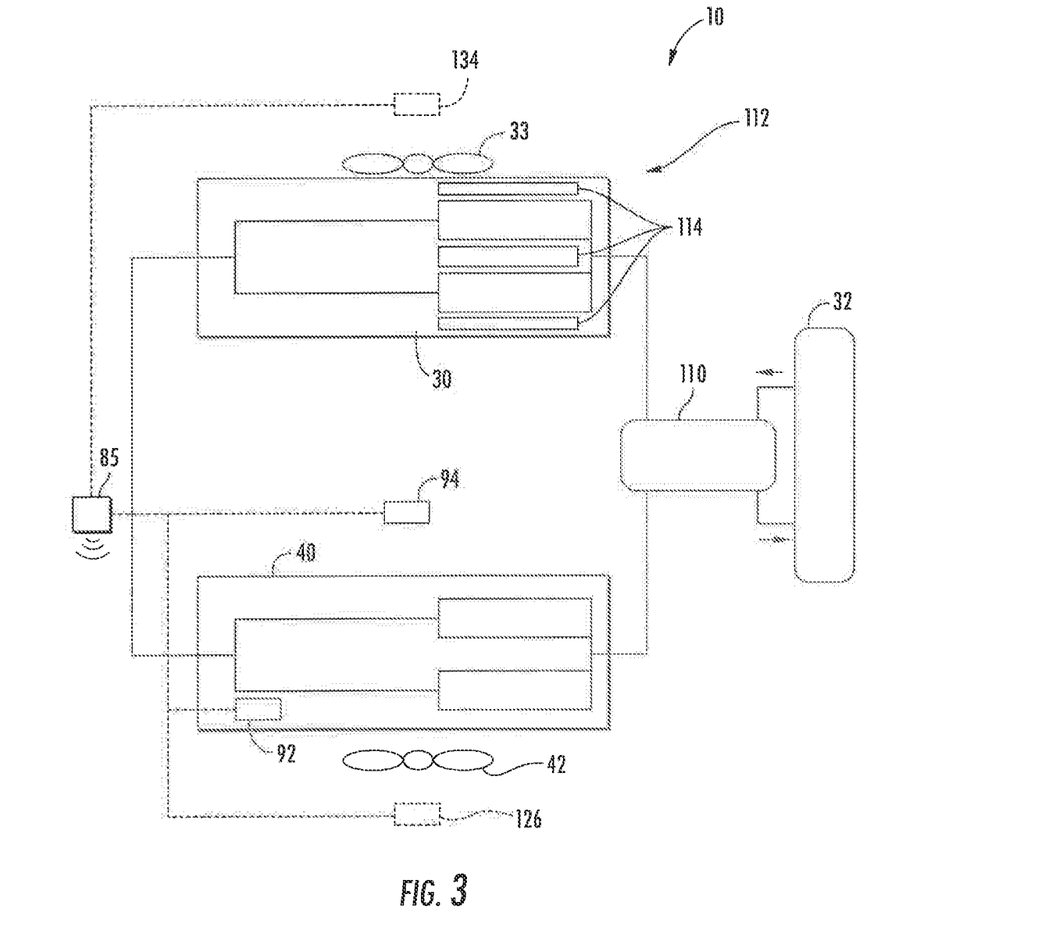
FIG. 3 provides a schematic view of an air conditioner unit according to exemplary embodiments of the present disclosure.

Referring now to the figures, in FIGS. 1 through 3, an air conditioner or air conditioner unit 10 according to various exemplary embodiments is provided. The air conditioner 10 is generally a one-unit type air conditioner, also conventionally referred to as a room air conditioner or package terminal air conditioner unit (PTAC). The air conditioner 10 includes an indoor portion 12 and an outdoor portion 14, and defines a vertical direction V, a lateral direction L, and a transverse direction T. Each direction V, L, T is perpendicular to each other, such that an orthogonal coordinate system is generally defined.

Although described in the context of a PTAC, an air conditioner unit as disclosed herein may be provided as a window unit, single-package vertical unit (SPVU), vertical packaged air conditioner (VPAC), or any other suitable single-package air conditioner. The air conditioner 10 is intended only as an exemplary unit and does not otherwise limit the scope of the present disclosure. Thus, it is understood that the present disclosure may be equally applicable to other types of air conditioner units.

Generally, a cabinet 20 of the air conditioner 10 contains various other components of the air conditioner 10. Cabinet 20 may include, for example, a rear grill 22 and a room front 24 that may be spaced apart along the transverse direction T by a wall sleeve 26. The rear grill 22 may be part of the outdoor portion 14, while the room front 24 is part of the indoor portion 12. Components of the outdoor portion 14, such as an outdoor heat exchanger 30, outdoor fan 33, and compressor 32 may be housed within the wall sleeve 26. A casing 34 may additionally enclose the outdoor fan 33, as shown. In one example, outdoor fan 33 is powered by a DC voltage fan motor. However, it should be appreciated that any suitable motor may be used to power outdoor fan 33.

Indoor portion 12 may include, for example, an indoor heat exchanger 40, a blower fan 42, and a (e.g., first) heating unit 44. These components may, for example, be housed behind the room front 24. Additionally, a bulkhead 46 may generally support or house various other components or portions thereof of the indoor portion 12, such as the blower fan 42 and the heating unit 44. Bulkhead 46 may generally separate and define the indoor portion 12 and outdoor portion 14.

Outdoor and indoor heat exchangers 30, 40 may be components of a thermodynamic assembly (i.e., sealed system), which may be operated as a refrigeration assembly (and thus perform a refrigeration cycle in a cooling mode) and, in the case of the heat pump unit embodiment, a heat pump (and thus perform a heat pump cycle in a heating mode). Thus, as is understood, exemplary heat pump unit embodiments may be selectively operated perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

In optional embodiments, such as exemplary heat pump unit embodiments, the sealed system includes a reversible refrigerant valve 110. Reversible refrigerant valve 110 selectively directs compressed refrigerant from compressor 32 to either indoor heat exchanger 40 or outdoor heat exchanger 30. For example, in a cooling mode, reversible refrigerant valve 110 is arranged or configured to direct compressed refrigerant from compressor 32 to outdoor heat exchanger 30. Conversely, in a heating mode, reversible refrigerant valve 110 is arranged or configured to direct compressed refrigerant from compressor 32 to indoor heat exchanger 40. Thus, reversible refrigerant valve 110 permits the sealed system to adjust between the heating mode and the cooling mode, as will be understood by those skilled in the art.

The sealed system or assembly may, for example, further include compressor 32 and an expansion device 38, both of which may be in fluid communication with the heat exchangers 30, 40 to flow refrigerant therethrough, as is generally understood. Expansion device 38 may be any suitable expansion device, such as a mechanical valve, capillary tube, electronic expansion valve, or other restriction device, for example. Optionally, the compressor 32 may be a variable speed compressor or, alternatively, a single speed compressor. When the assembly is operating in a cooling mode, and thus performs a refrigeration cycle, the indoor heat exchanger 40 acts as an evaporator and the outdoor heat exchanger 30 acts as a condenser. In heat pump unit embodiments, when the assembly is operating in a heating mode, and thus performs a heat pump cycle, the indoor heat exchanger 40 acts as a condenser and the outdoor heat exchanger 30 acts as an evaporator. The outdoor and indoor heat exchangers 30, 40 may each include coils 31, 41, as illustrated, through which a refrigerant may flow for heat exchange purposes, as is generally understood. For instance, and as will be understood, in response to an input temperature setting, compressor 32 may activate for a cycle (e.g., cooling cycle or heating cycle) until the input temperature setting (or hysteresis thereof) is detected within the corresponding room.

Bulkhead 46 may include various peripheral surfaces that define an interior 50 thereof. For example, bulkhead 46 may include a first sidewall 52 and a second sidewall 54 which are spaced apart from each other along the lateral direction L. A rear wall may extend laterally between the first sidewall 52 and second sidewall 54. Bulkhead 46 may additionally include, for example, an air diverter 68, which may extend between the sidewalls 52, 54 along the lateral direction L and through which air may flow.

In exemplary embodiments, blower fan 42 may be a tangential fan. Alternatively, however, any suitable fan type may be utilized. Blower fan 42 may include a blade assembly 70 and a motor 72. The blade assembly 70, which may include one or more blades disposed within a fan housing 74, may be disposed at least partially within the interior 50 of the bulkhead 46, such as within the upper portion. As shown, blade assembly 70 may for example extend along the lateral direction L between the first sidewall 52 and the second sidewall 54. The motor 72 may be connected to the blade assembly 70, such as through the fan housing 74 to the blades via a shaft. Operation of the motor 72 may rotate the blades, thus generally operating the blower fan 42 (e.g., in a cooling mode, heating mode, or fan-only mode). Further, in exemplary embodiments, motor 72 may be disposed exterior to the bulkhead 46. Accordingly, the shaft may for example extend through one of the sidewalls 52, 54 to connect the motor 72 and blade assembly 70.

In exemplary embodiments, heating unit 44 includes one or more heater banks 80. Each heater bank 80 may be operated as desired to produce heat. In some embodiments, three heater banks 80 may be utilized, as shown. Alternatively, however, any suitable number of heater banks 80 may be utilized. Each heater bank 80 may further include at least one heater coil or coil pass 82, such as in exemplary embodiments two heater coils or coil passes 82. Alternatively, other suitable heating elements may be utilized. As is understood, each heater coil pass 82 may be provided as a resistive heating element configured to generate heat in response to resistance to an electrical current flowed therethrough. For instance, and as will be understood, in response to an input temperature setting, at least a portion of heater bank 82 may activate as an electrical current is flowed therethrough for a heating cycle until the input temperature setting (or hysteresis thereof) is detected within the corresponding room.

The operation of air conditioner 10, including compressor 32 (and thus the sealed system generally) blower fan 42, fan 33, heating unit 44, and other suitable components, may be controlled by a control board or controller 85. Controller 85 may be in communication (via for example a suitable wired or wireless connection) to such components of the air conditioner 10. By way of example, the controller 85 may include a memory and one or more processing devices such as microprocessors, CPUs or the like, such as general or special purpose microprocessors operable to execute programming instructions or micro-control code associated with operation of air conditioner 10 (e.g., as or as part of a conditioner operation). The memory may be a separate component from the processor or may be included onboard within the processor. The memory may represent random access memory such as DRAM, or read only memory such as ROM or FLASH. Generally, the processor executes programming instructions stored in memory.

Air conditioner 10 may additionally include a control panel 87 and one or more user inputs 89, which may be included in control panel 87. The user inputs 89 may be in communication with the controller 85. A user of the air conditioner 10 may interact with the user inputs 89 to operate the air conditioner 10, and user commands may be transmitted between the user inputs 89 and controller 85 to facilitate operation of the air conditioner 10 based on such user commands (e.g., to specify a desired temperature, cooling mode, heating mode, fan-only mode, idle mode, date/time, service event, etc.). A display 88 may additionally be provided in the control panel 87 and may be in communication with the controller 85. Display 88 may, for example be a touchscreen or other text-readable display screen, or alternatively may simply be a light that can be activated and deactivated as required to provide an indication of, for example, an event, setting, or mode for the air conditioner 10.

In some embodiments, a first indoor temperature sensor 92 (e.g., indoor refrigerant temperature sensor) or a second indoor temperature sensor 94 (e.g., indoor ambient temperature sensor) is disposed within the indoor portion 12. In optional embodiments, a third indoor temperature sensor 126 (e.g., indoor outlet temperature sensor) (as indicated in phantom lines) is disposed within the indoor portion 12. In alternative embodiments, indoor portion 12 is free of any such third indoor temperature sensor 126. Each temperature sensor may be configured to sense the temperature of its surroundings. For example, each temperature sensor may be a thermistor or a thermocouple. The indoor temperature sensors 92, 94, 126 may be in communication with the controller 85, and may transmit temperatures sensed thereby to the controller 85 (e.g., as one or more voltages or signals, which the controller 85 is configured to interpret as temperature values). Optionally, the voltages or signal transmitted to the controller 85 may be transmitted in response to a polling request or signal received by one or more of the indoor temperature sensors 92, 94, 126. For example, a polling request or signal may be transmitted to one or more of the indoor temperature sensors 92, 94, 126 from the controller 85.

First indoor temperature sensor 92 may be disposed proximate to the indoor heat exchanger 40 (such as relative to the second indoor temperature sensor 94). For example, in some embodiments, first indoor temperature sensor 92 may be in contact with the indoor heat exchanger 40, such as with a coil 41 thereof. The first indoor temperature sensor 92 may be configured to detect a temperature for the indoor heat exchanger 40. Second indoor temperature sensor 94 may be spaced from the indoor heat exchanger 40, such as in the transverse direction T. For example, the second indoor temperature sensor 94 may be in contact with the room front 24, as illustrated in FIG. 1. Second indoor temperature sensor 94 may be configured to detect a temperature of air entering the indoor portion 12. Third indoor temperature sensor 126 may be spaced apart from and disposed downstream of both the first indoor temperature sensor 92 and the second indoor temperature sensor 94. For example, the third indoor temperature sensor 126 may be attached to or in contact with the air diverter 68. The third indoor temperature sensor 126 may be configured to detect a temperature for air exiting the indoor portion 12. During certain operations (e.g., in a cooling mode), air may thus generally flow across or adjacent to the second indoor temperature sensor 94, the first indoor temperature sensor 92, and then the third indoor temperature sensor 126.

As shown, outdoor heat exchanger 30 may further include an outdoor (e.g., second) heating unit 112 provided at or near coils 31 of outdoor heat exchanger 30. Second heating unit 112 may be similar to heating unit 44. For instance, second heating unit 112 may include one or more heater banks 114. Each heater bank 114 may be operated as desired to produce heat to heat coils 31 of outdoor heat exchanger 30. In some embodiments, three heater banks 114 may be utilized, as shown. Alternatively, however, any suitable number of heater banks 114 may be utilized. Each heater bank 114 may further include at least one heater coil or coil pass. Alternatively, other suitable heating elements may be utilized. As is understood, each heater coil pass may be provided as a resistive heating element configured to generate heat in response to resistance to an electrical current flowed therethrough.

Outdoor heat exchanger 30 may further include a rotational speed sensor 134 (e.g., in communication with controller 85). Generally, the rotational speed sensor 134 may be configured measure a rotational speed (e.g., revolutions per minute RPM) of outdoor fan 33 and send the resulting measurement to controller 85. The rotational speed sensor may be any suitable sensor capable of measuring a rotational speed of outdoor fan 33, for instance a tachometer, an opto-isolator, or a Hall sensor. The rotational speed sensor 134 may be provided on outdoor fan 33, or alternatively, adjacent to outdoor fan 33 so as to accurately measure a rotational speed of outdoor fan 33.

Figure 4:
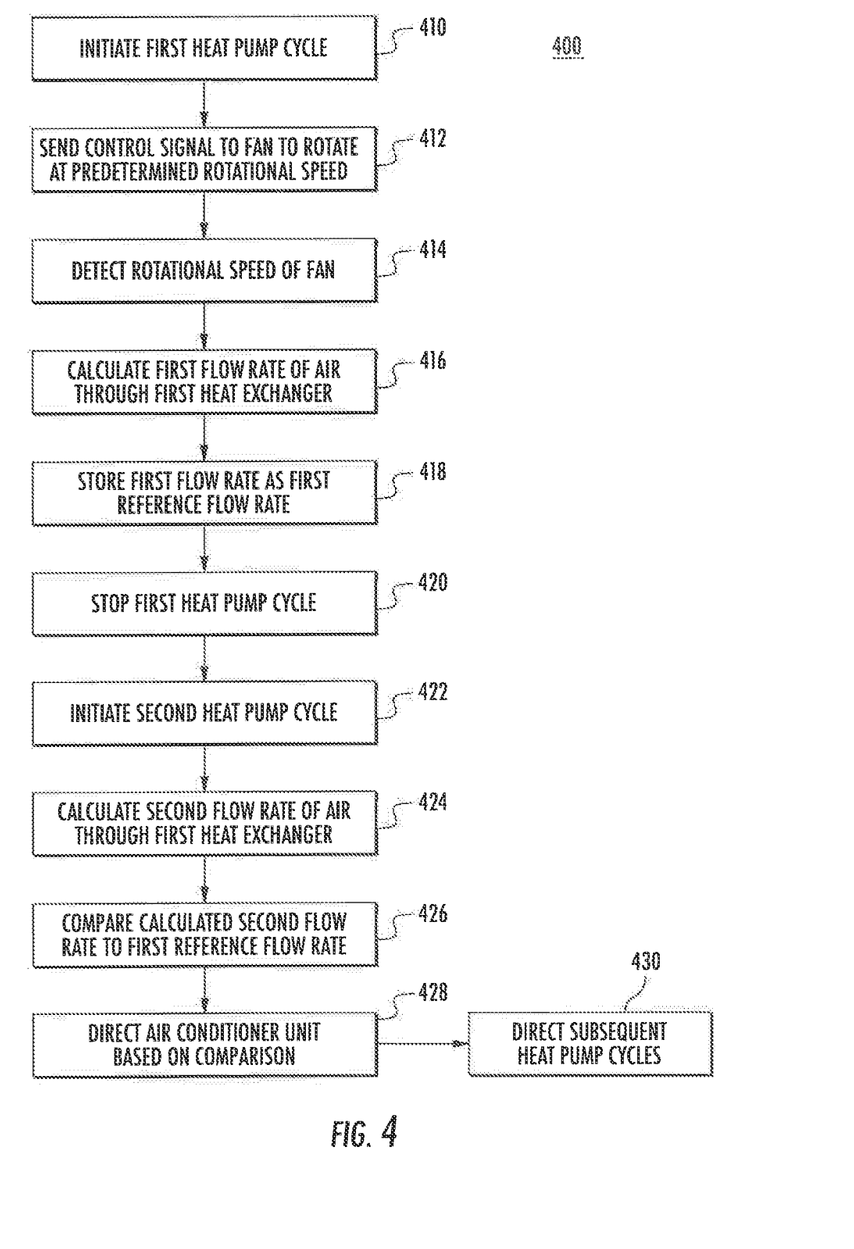
FIG. 4 provides a flow chart illustrating a method of operating an air conditioner unit according to exemplary embodiments of the present disclosure.

Referring now to FIG. 4, the present disclosure may further be directed to methods (e.g., method 400) of operating an air conditioner unit, such as air conditioner unit 10. In exemplary embodiments, controller 85 may be operable to perform various steps of a method in accordance with the present disclosure.

The methods (e.g., 400) may occur as, or as part of, a conditioner operation (e.g., a cooling or heating operation) of the air conditioner 10. In particular, the methods disclosed herein may advantageously facilitate the accurate or efficient detection of frost, such as at or on outdoor heat exchanger 30. Additionally or alternatively, the methods disclosed herein may permit frost detection without the need of (e.g., without requiring) any temperature sensors or temperature measurements at outdoor portion 14.

At 410, the method 400 includes initiating a first heat pump cycle. Specifically, the controller may send a signal to operate the compressor to compress a refrigerant and circulate the refrigerant through the corresponding sealed system. For example, refrigerant may be motivated by the compressor through the reversible refrigerant valve, a first heat exchanger (e.g., the indoor heat exchanger), the expansion device, a second heat exchanger (e.g., the outdoor heat exchanger), and back through the reversible refrigerant valve. In the first heat pump cycle, the refrigerant may be circulated in a first direction. In some embodiments, the first direction includes circulating the refrigerant first through the indoor heat exchanger, followed by the expansion device and the outdoor heat exchanger. In such embodiments, the indoor heat exchanger functions as a condenser and the outdoor heat exchanger functions as an evaporator. In alternative embodiments, the first direction includes circulating the refrigerant first through the outdoor heat exchanger, followed by the expansion device and the indoor heat exchanger. In this embodiment, the outdoor heat exchanger functions as a condenser and the indoor heat exchanger functions as an evaporator.

At 412, the method 400 includes sending a first control or voltage signal to the outdoor fan to rotate at a predetermined rotational speed. The predetermined rotational speed may be an intended speed or setting at which the outdoor fan is to rotate according to the controller. In other words, the predetermined rotational speed may be a target rotational speed setting (e.g., provided as part of an automatic or controller-directed feedback loop) as determined by the controller to circulate enough air through the outdoor heat exchanger to produce a desired indoor temperature. The controller may alter the first control signal to the outdoor fan in order to rotate the outdoor fan at the predetermined rotational speed. The first control signal may vary depending on a power of the outdoor fan (e.g., motor size and type), an amount of air required to pass over the coils of the outdoor heat exchanger, or the like.

At 414, the method 400 includes detecting a first actual rotational speed of the outdoor fan. For example, the rotational speed sensor may sense a first rotational speed of the outdoor fan after the outdoor fan receives the first control signal from the controller at 412. The rotational speed sensor may then send the resultant measurement to the controller (e.g., to be stored in the memory portion of the controller). The actual rotational speed of the outdoor fan may be a measured rotational speed and may, under certain conditions, differ from the predetermined rotational speed. For example, the second control signal from the controller may be higher than the first control signal in order to have the fan rotate at the predetermined rotational speed if the outdoor heat exchanger is dirty (e.g., covered in dust or debris) or coated with frost.

At 416, the method 400 includes calculating a first flow rate of air through the first heat exchanger (e.g., the outdoor heat exchanger) based on the control signal and the actual rotational speed. The first flow rate may also be calculated including a unit voltage of the fan motor. For instance, the controller may perform a calculation including the unit voltage of the fan motor, the control signal sent to the fan motor, and the actual rotational speed of the outdoor fan (e.g., as sensed by the rotational speed sensor). The flow rate may be a volumetric flow rate. Alternatively, the flow rate may be a mass flow rate or any other suitable flow rate.

In alternative embodiments, the controller may perform a calculation including two variables out of the group of the unit voltage of the fan motor, the voltage signal sent to the fan motor, and the actual rotational speed of the outdoor fan. The controller may be preprogrammed with a function or series of functions or formulas configured to calculate the flow rate. As example function is provided below:

$$\text{Flow}=A+B*\text{RPM}+C*CS+D*\text{Voltage}+E*\text{RPM}^2+F*CS^2+G*\text{Voltage}^2+H*\text{RPM}*CS+I*CS*\text{Voltage}+J*\text{Voltage}*\text{RPM}$$

where "CS" is the control signal and variables A through J are experimental coefficients determined through testing a representative model of an exemplary air conditioning unit.

In still other embodiments, the controller may perform a calculation using a square or cube of the group of variables. For instance, the unit voltage may be squared or cubed, the voltage signal may be squared or cubed, or the actual rotational speed of the outdoor fan may be squared or cubed. However, it is understood that other functions or formulas may be used in conjunction with or, alternatively to, the example function given above.

At 418, the method 400 includes storing the first flow rate as a first reference flow rate. For instance, the controller may store the calculated first flow rate as a reference flow rate (e.g., within a reference flow rate cell or placeholder of memory). In some embodiments, the first reference flow rate can act as or be understood as a flow rate of air over the coils of the outdoor heat exchanger in a frost-free state (e.g., when there is no frost present on the coils).

At 420, the method 400 includes stopping the first heat pump cycle. In other words, the controller may stop an operation of the compressor and subsequently a circulation of refrigerant. Any suitable signal may be used to signal the controller to stop the first heat pump cycle. For instance, a time limit may be input by a user into the controller to stop the first heat pump cycle after a predetermined amount of time. In additional or alternative embodiments, the second indoor temperature sensor is configured to continually measure a temperature of an interior room in which the indoor portion is situated. The controller may then stop the first heat pump cycle when an ambient temperature of the interior room meets or exceeds a predetermined temperature input by the user. According to some such embodiments, when the air conditioner unit is operating in a heating mode (i.e., the indoor heat exchanger functions as a condenser and the outdoor heat exchanger functions as an evaporator), the controller is configured stop the first heat pump cycle when the temperature of the interior room rises above the predetermined temperature.

At 422, the method 400 includes initiating a second heat pump cycle (e.g., following or subsequent to 420). Similar to the first heat pump cycle, the controller may send a signal to operate the compressor to compress a refrigerant and circulate the refrigerant through the corresponding sealed system. For example, refrigerant may be motivated by the compressor through the reversible refrigerant valve, the first heat exchanger (e.g., the indoor heat exchanger), the expansion device, the second heat exchanger (e.g., the outdoor heat exchanger), and back through the reversible refrigerant valve. In the second heat pump cycle, the refrigerant may be circulated in the first direction. In some embodiments, the first direction includes circulating the refrigerant first through the indoor heat exchanger, followed by the expansion device and the outdoor heat exchanger. In such embodiments, the indoor heat exchanger functions as a condenser and the outdoor heat exchanger functions as an evaporator. In alternative embodiments, the first direction includes circulating the refrigerant first through the outdoor heat exchanger, followed by the expansion device and the indoor heat exchanger. In this embodiment, the outdoor heat exchanger functions as a condenser and the indoor heat exchanger functions as an evaporator.

At 424, the method 400 includes calculating a second flow rate of air through the first heat exchanger (e.g., during the second heat pump cycle). The calculation of the second flow rate of air through the first heat exchanger may include a sending a second control signal to the outdoor fan to operate at the predetermined rotational speed. The predetermined rotational speed may be an intended speed at which the outdoor fan is to rotate according to the controller. In other words, the predetermined rotational speed is a target rotational speed as determined by the controller to circulate enough air through the outdoor heat exchanger to produce a desired indoor temperature.

The controller may alter the second control signal to the outdoor fan in order to rotate the outdoor fan at the predetermined rotational speed. The second voltage signal may vary depending on a power of outdoor fan (i.e., motor size and type), an amount of air required to pass over the coils of the outdoor heat exchanger, or the like. The calculation of the second flow rate of air through the first heat exchanger may also include detecting a second actual rotational speed of the outdoor fan. The rotational speed sensor may sense a second rotational speed of the outdoor fan after the outdoor fan receives the second control signal from the controller. The rotational speed sensor may then send the resultant measurement back to the controller to be stored in the memory portion of the controller. The actual rotational speed of the outdoor fan may be a measured rotational speed and may differ from the predetermined rotational speed. For example, the second control signal from the controller may be higher than the first control signal in order to have the fan rotate at the predetermined rotational speed if the outdoor heat exchanger is dirty (e.g., covered in dust or debris) or coated with frost.

At 426, the method 400 includes comparing the calculated second flow rate to the first reference flow rate. For example, the controller may compare the calculated second flow rate to the first reference flow rate and calculate a difference between the two (e.g., a threshold percentage difference). In other words, the calculated second flow rate may be stored as a certain percentage of the first reference flowrate. From the comparison (e.g., according to the calculated difference), a determination may be made as to whether the second flow rate is within a predetermined threshold (e.g., a certain threshold percentage) relative to the first reference flow rate. Optionally, the predetermined threshold may be a percentage of 50% of the (e.g., first) reference flow rate.

At 428, the method 400 includes directing the air conditioner unit based on the comparison of the calculated second flow rate to the first reference flow rate at 426. In some embodiments, the controller analyzes a result of the comparison between the calculated second flow rate and the first reference flow rate. If the calculated second flow rate meets the predetermined threshold of the first reference flow rate, the second heat pump cycle may continue to run. Thus, the second heat pump cycle may be maintained in response to a determination that the calculated second flow rate is within the predetermined threshold (e.g., threshold percentage). Optionally, the controller may then analyze whether to stop the second heat pump cycle according to an alternative signal (e.g., an interior temperature of the room, a time limit, etc.). Accordingly, this may be referred to as a normal operation of the air conditioner unit. In turn, second heat pump cycle may be run continuously until the calculated second flow rate is less than the first reference flow rate by a predetermined percentage threshold (or operation is otherwise halted). Further, any number of successive heat pump cycles may be run until the calculated second flow rate does not meet the predetermined threshold of the first reference flowrate.

If the calculated second flow rate is less than the first reference flow rate by the predetermined threshold, the controller may stop the second heat pump cycle (i.e., stop a circulation of the refrigerant). Thus, the second heat pump cycle may be restricted or stopped in response to a determination that the second flow rate is less than the predetermined threshold (e.g., threshold percentage). Additionally or alternatively, the controller may initiate a first defrost cycle (e.g., subsequent to the second heat pump cycle being stopped or otherwise in response to the determination that the second flow rate is less than the predetermined threshold).

The first defrost cycle may include circulating the refrigerant in a second direction opposite the first direction. For example, circulating the refrigerant in the second direction may include circulating the refrigerant first through the outdoor heat exchanger, followed by the expansion device and the outdoor heat exchanger. In this embodiment, high temperature refrigerant is circulated through the outdoor heat exchanger and thus frost may be melted from the coils. Additionally or alternatively, the defrost cycle may include activating one or more of the heater banks (e.g., while maintaining the second heat pump cycle in a stopped state). In optional embodiments, the defrost cycle includes simultaneously circulating the refrigerant in the second direction and activating one or more of the heater banks.

Following the defrost cycle, the coils of the outdoor heat exchanger may be defrosted, and the normal operation of the air conditioner unit may resume.

At 430, the method 400 includes directing subsequent heat pump cycles. In some embodiments, 430 includes storing a third flow rate as a second reference flow rate (e.g., in place of the first reference flow rate). For instance, a third heat pump cycle may be initiated after the defrost cycle is stopped (e.g., following the defrost cycle or 428). The third heat pump cycle may be similar to the first heat pump cycle or the second heat pump cycle described above. For instance, to initiate the third heat pump cycle, the controller may send a signal to operate the compressor to compress a refrigerant and circulate the refrigerant through the corresponding sealed system. For example, refrigerant may be motivated by the compressor through the reversible refrigerant valve, a first heat exchanger (e.g., the indoor heat exchanger), the expansion device, a second heat exchanger (e.g., the outdoor heat exchanger), and back through the reversible refrigerant valve. During the third heat pump cycle, the controller may send a third control signal to the outdoor fan to rotate at a predetermined rotational speed (e.g., identical to or, alternatively, different from the predetermined rotational speed of the first heat pump cycle or the second heat pump cycle). The third control signal may be similar to the first control signal described above. The controller may detect a third actual rotational speed of the outdoor fan. The third actual rotational speed may be similar to the first actual rotational speed described above. The controller may then stop the third heat pump cycle. Similar to the stopping of the first heat pump cycle, any suitable signal may be used to signal the controller to stop the third heat pump cycle. For instance, a time limit may be input by a user into the controller to stop the third heat pump cycle after a predetermined amount of time. In additional or alternative embodiments, the second indoor temperature sensor is configured to continually measure a temperature of an interior room in which the indoor portion is situated. The controller may then stop the third heat pump cycle when an ambient temperature of the interior room meets or exceeds a predetermined temperature input by the user.

After the third heat pump cycle is stopped, the controller may then calculate a third flow rate according to the variables stored during the third heat pump cycle. For example, the controller calculates the third flow rate using the third control signal and the third actual rotational speed of the outdoor fan. The controller may use Equation 1 described above to calculate the third flow rate. The third calculated flow rate may then be stored as a second reference flow rate. In some such embodiments, the second reference flow rate may replace, overwrite, or otherwise take the place of the first reference flow rate. The second reference flow rate may be different from the first reference flow rate. For instance, during a normal operation of the first heat pump cycle, the second heat pump cycle, and subsequent heat pump cycles before the first defrost cycle, dirt or debris may build up on the coils of the outdoor heat exchanger. This may alter a normal air flow (e.g., a defrost-free airflow). As such, the calculated third flow rate may be stored as the second reference flow rate in place of the first reference flow rate to establish a new reference flow rate.

Following the third heat pump cycle, the method 400 may include initiating a fourth heat pump cycle. The fourth heat pump cycle may be similar to the first, second, or third heat pump cycles described above. The controller may then calculate a fourth flow rate according to the variables stored during the fourth heat pump cycle. The controller may then compare the calculated fourth flow rate to the second reference flow rate and calculate a difference between the two (e.g., a threshold percentage difference). In other words, the calculated fourth flow rate may be stored as a certain percentage of the second reference flowrate. From the comparison (e.g., according to the calculated difference), a determination may be made as to whether the fourth flow rate is within a predetermined threshold (e.g., a certain threshold percentage) relative to the second reference flow rate. Optionally, the predetermined threshold may be a percentage of 50% of the (e.g., second) reference flow rate.

If the calculated fourth flow rate is less than the second reference flow rate by the predetermined threshold, the controller may stop the fourth heat pump cycle (i.e., stop a circulation of the refrigerant). Thus, the fourth heat pump cycle may be restricted or stopped in response to a determination that the fourth flow rate is less than the predetermined threshold (e.g., threshold percentage). Additionally or alternatively, the controller may initiate a new or second defrost cycle (e.g., subsequent to the fourth heat pump cycle being stopped or otherwise in response to the determination that the fourth flow rate is less than the predetermined threshold). The second defrost cycle may be similar to the first defrost cycle described above.

Although four heat pump cycles are described above, it should be understood that any number of heat pump cycles may be initiated and performed, and any amount of reference flow rates may be calculated and stored in accordance with the current disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an air conditioner unit comprising a first heat exchanger, a fan, and a controller, the method comprising:
    initiating a first heat pump cycle, the first heat pump cycle comprising:
        sending a control signal to the fan to rotate at a predetermined rotational speed, and
        detecting an actual rotational speed of the fan;
    calculating a first flow rate of air through the first heat exchanger based on the control signal and the actual rotational speed;
    storing the first flow rate as a first reference flow rate;
    stopping the first heat pump cycle;
    initiating a second heat pump cycle;
    calculating a second flow rate of air through the first heat exchanger;
    comparing the calculated second flow rate to the first reference flow rate; and
    directing the air conditioner unit based on the comparison of the calculated second flow rate to the first reference flow rate.

2. The method of claim 1, wherein the actual rotational speed is detected by a rotational speed sensor provided on the fan.

3. The method of claim 1, wherein the first heat pump cycle further comprises circulating a refrigerant through a sealed refrigerant system in a first direction, the sealed refrigerant system comprising a compressor, the first heat exchanger, an expansion device, and a second heat exchanger.

4. The method of claim 3, wherein comparing the calculated second flow rate to the first reference flow rate comprises determining the calculated second flow rate is less than the first reference flow rate by a predetermined threshold, wherein directing the air conditioner unit comprises initiating a defrost cycle comprising activating a heater bank directed at the first heat exchanger.

5. The method of claim 3, wherein comparing the calculated second flow rate to the first reference flow rate comprises determining the calculated second flow rate is less than the first reference flow rate by a first predetermined threshold, wherein directing the air conditioner unit comprises initiating a defrost cycle at the sealed refrigerant system.

6. The method of claim 5, wherein the defrost cycle comprises circulating the refrigerant through the sealed refrigerant system in a second direction opposite the first direction.

7. The method of claim 5, wherein the defrost cycle comprises activating a heater bank directed at the first heat exchanger.

8. The method of claim 5, further comprising:
stopping the defrost cycle;
initiating a third heat pump cycle;
calculating a third flow rate of air through the first heat exchanger based on the control signal and the actual rotational speed during the third heat pump cycle;
storing the third flow rate as a second reference flow rate in place of the first reference flow rate;
initiating a fourth heat pump cycle;
calculating a fourth flow rate of air through the first heat exchanger;
comparing the calculated fourth flow rate to the second reference flow rate; and
directing the air conditioner unit based on the comparison of the calculated second flow rate to the second reference flow rate.

9. The method of claim 8, wherein comparing the calculated fourth flow rate to the second reference flow rate comprises determining the calculated fourth flow rate is less than the second reference flow rate by a second predetermined threshold, wherein directing the air conditioner unit comprises initiating the defrost cycle at the sealed refrigerant system.

10. The method of claim 9, wherein the second predetermined threshold is a threshold percentage of 50% of the first reference flow rate or the second reference flow rate.

11. An air conditioner unit, comprising:
a sealed refrigerant system comprising a refrigerant conduit, a first heat exchanger, an expansion device, and a second heat exchanger in fluid communication with each other along the refrigerant conduit, and a compressor to drive a refrigerant through the sealed refrigerant system;
a fan located adjacent to the first heat exchanger to circulate air over the first heat exchanger; and
a controller configured to initiate an operation sequence, the operation sequence comprising:
initiating a heat pump cycle, the heat pump cycle comprising:
sending a control signal to the fan to rotate at a predetermined rotational speed, and
detecting an actual rotational speed of the fan;
calculating a first flow rate of air through the heat exchanger based on the control signal and the actual rotational speed;
storing the first flow rate as a first reference flow rate;
stopping the heat pump cycle;
initiating a second heat pump cycle;
calculating a second flow rate of air through the first heat exchanger;
comparing the calculated second flow rate to the first reference flow rate; and
directing the air conditioner unit based on the comparison of the calculated second flow rate to the first reference flow rate.

12. The air conditioner unit of claim 11, wherein the actual rotational speed is detected by a rotational speed sensor provided on the fan.

13. The air conditioner unit of claim 11, wherein refrigerant is circulated through the sealed refrigerant system in a first direction.

14. The air conditioner unit of claim 13, wherein comparing the calculated second flow rate to the first reference flow rate comprises determining the calculated second flow rate is less than the first reference flow rate by a predetermined threshold, wherein directing the air conditioner unit comprises initiating a defrost cycle comprising activating a heater bank directed at the first heat exchanger.

15. The air conditioner unit of claim 13, wherein comparing the calculated second flow rate to the first reference flow rate comprises determining the calculated second flow rate is less than the first reference flow rate by a first predetermined threshold, wherein directing the air conditioner unit comprises initiating a defrost cycle at the sealed refrigerant system.

16. The air conditioner unit of claim 15, wherein the defrost cycle comprises circulating the refrigerant through the sealed refrigerant system in a second direction opposite the first direction.

17. The air conditioner unit of claim 15, wherein the defrost cycle comprises activating a heater bank directed at the first heat exchanger.

18. The air conditioner unit of claim 15, wherein the operation sequence further comprises:
stopping the defrost cycle;
initiating a third heat pump cycle;
calculating a third flow rate of air through the first heat exchanger based on the control signal and the actual rotational speed during the third heat pump cycle;
storing the third flow rate as a second reference flow rate in place of the first reference flow rate;
initiating a fourth heat pump cycle;
calculating a fourth flow rate of air through the first heat exchanger;
comparing the calculated fourth flow rate to the second reference flow rate; and
directing the air conditioner unit based on the comparison of the calculated second flow rate to the second reference flow rate.

19. The air conditioner unit of claim 18, wherein comparing the calculated fourth flow rate to the second reference flow rate comprises determining the calculated fourth flow rate is less than the second reference flow rate by a second predetermined threshold, wherein directing the air conditioner unit comprises initiating the defrost cycle at the sealed refrigerant system.

20. The air conditioner unit of claim 19, wherein the second predetermined threshold is a threshold percentage of 50% of the first reference flow rate or the second reference flow rate.

* * * * *